UNITED STATES PATENT OFFICE.

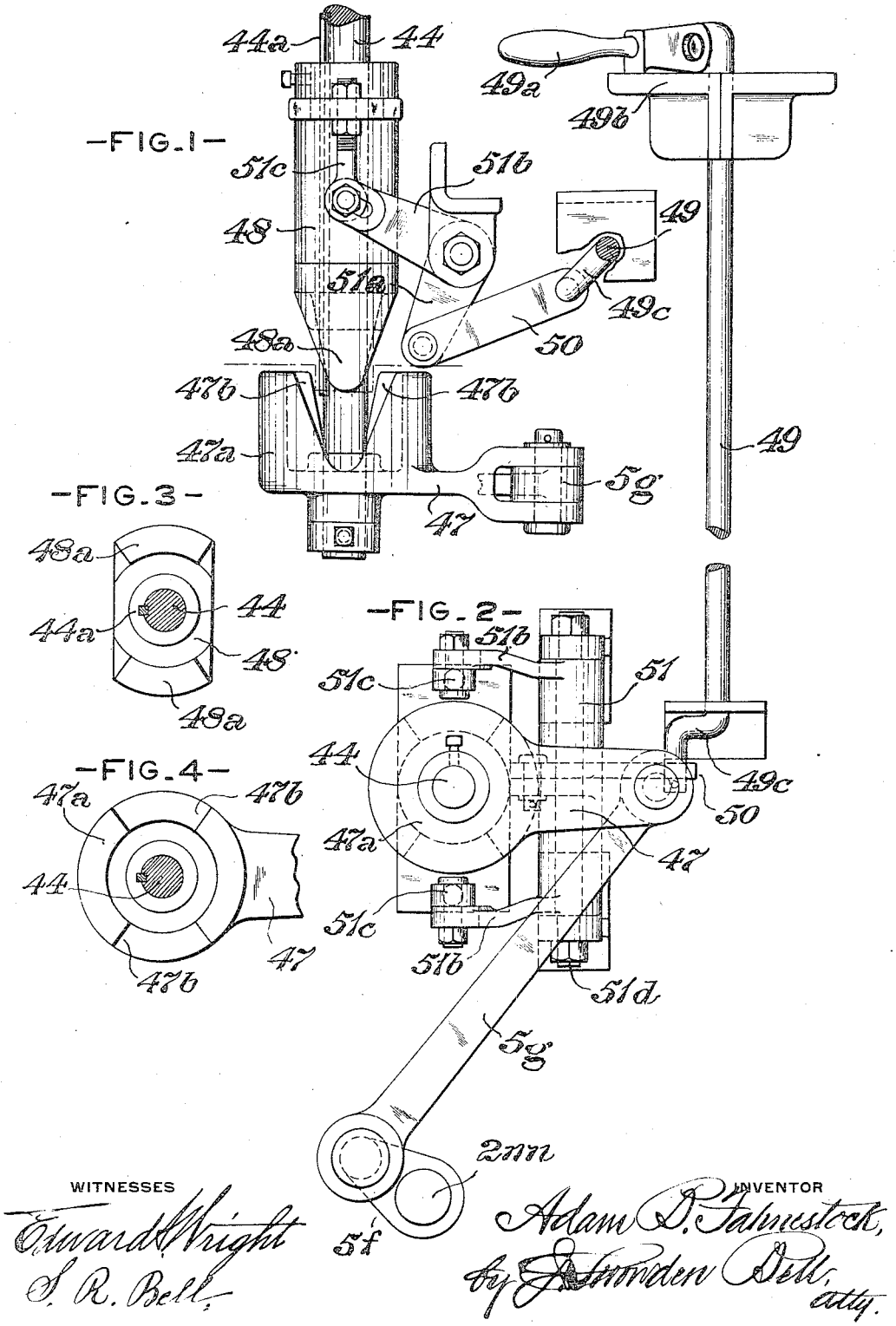

ADAM B. FAHNESTOCK, OF GREAT NECK, NEW YORK.

VARIABLE-TRAVERSE DRIVING MECHANISM.

1,323,972.  Specification of Letters Patent.  Patented Dec. 2, 1919.

Application filed January 2, 1919. Serial No. 269,290.

*To all whom it may concern:*

Be it known that I, ADAM B. FAHNESTOCK, of Great Neck, in the county of Nassau and State of New York, have invented a certain new and useful Improvement in Variable-Traverse Driving Mechanism, of which improvement the following is a specification.

My invention relates to appliances for transmitting motion from a driving to a driven shaft, and its object is to provide means whereby different desired ranges of traverse, in operation, may be imparted to a driven shaft, from a driving shaft, and the movement of the driven shaft be stopped, whenever, and for such periods, as it is not required to be actuated, and thereafter be reinstated, as the operator may desire.

The improvement claimed is hereinafter fully set forth.

In the accompanying drawings:

Figure 1 is a plan or top view of a variable traverse driving mechanism, illustrating an embodiment of my invention;

Fig. 2, an end view, in elevation, of the same;

Fig. 3, a view, in elevation, of the engaging end of the tongue or sliding member, and;

Fig. 4, a similar view of the engaging end of the jaw member.

In the practice of my invention, referring descriptively to the specific embodiment thereof in an appliance designed for imparting variable traverse to a fuel feeder, which is herein exemplified, a driven shaft, 44, is journaled in bearings in which it may be vibrated or oscillated, and is provided with a sleeve coupling member, 48, which is adapted to be moved longitudinally on the shaft, and, in any and all positions thereon, to be oscillated, with the shaft, about the axial line thereof. This capacity is afforded by mounting the member, 48, on a key or feather, 44$^a$, formed on or fixed to the shaft. Tapering or inclined side tongues, 48$^a$, project longitudinally from one end of the coupling member, 48.

The hub, 47$^a$, of a rocker arm, 47, is fitted freely on the shaft, 44, adjacent to the outer ends of the tongues, 48$^a$, said hub forming a jaw coupling member, which is so recessed as to provide radial jaw bearing faces, 47$^b$, which are outwardly inclined in the direction of the axial line of the shaft, 44, as clearly shown in Fig. 1, from which it will be seen that they are adapted to be engaged by the tongues, 48$^a$, of the member, 48, when the latter is moved toward the hub, 47$^a$. The maximum width of the angular recesses is equal to the length of the arc traversed by the periphery of the hub, in each vibratory movement thereof, about the axial line of the shaft, 44, added to the width of the outer end of a tongue of the sleeve member, 48.

Vibratory or oscillatory movement is imparted to the rocker arm, 47, and integral jaw member, 47$^a$, about the axial line of the shaft, 44, from a driving shaft, 2$^{nn}$, which is rotated by any suitable prime mover, and carries a crank 5$^f$, which is coupled to the rocker arm, 47, by a connecting rod, 5$^g$. When the coupling member 48 is moved on the driven shaft, 44, into the position shown in Fig. 1, in which only the outer ends of the tongues, 48$^a$, enter the angular recesses of the jaw member, 47$^a$, the vibratory movements imparted to the arm, 47, from the driving shaft, 2$^{nn}$, will not be transmitted to the shaft, 44, which will consequently remain stationary. When, however, the coupling member, 48, is moved along the shaft, 44, until its tongues engage the jaws of the member, 47$^a$, vibratory movement will be imparted to the shaft, 44, the extent of such movement being greater or less, proportionately to the depth to which the tongues enter the angular recesses, and being at its maximum, determined by the throw of the crank, 5$^f$, when the tongues are entered to the full depth of the recesses.

The longitudinal adjustment of the coupling member, 48, on the shaft, 44, is manually effected, as may, from time to time, be desired, by a shaft, 49, which is journaled in suitable bearings, and carries, on its upper end, an operating handle, 49$^a$, which is adapted to engage a locking segment, 49$^b$. The lower end of the shaft, 49, is provided with a crank arm, 49$^c$, which is coupled, by a link, 50, to an arm, 51$^a$, on a tubular rocker, 51, which is journaled on a pin, 51$^d$, and carries arms 51$^b$, which project at an angle to the arm, 51$^a$, and are coupled to bolts, 51$^c$, on the sleeve member, 48. By proper movement of the operating handle, the member, 48, may be adjusted in position to impart the maximum, minimum, or any desired intermediate degree of vibratory traverse to the driven shaft, 44, or to cause the entire cessation of movement thereof, whenever, and for such periods as, variation or cessation of movements may be desired.

My invention herein set forth is described and shown, as applied in connection with the feeding mechanism of a mechanical stoker, in an application for Letters Patent filed by me, jointly with Albert G. Elvin and Frank H. Clark, under date of December 28, 1918, Serial No. 268,635, but is not claimed in said application.

I claim as my invention and desire to secure by Letters Patent:

1. In a variable traverse driving mechanism, the combination of a driving shaft; a driven shaft; a jaw coupling member mounted freely on the driven shaft; a tongue coupling member rotatable with, and longitudinally movable on, said shaft; tapered tongues fixed on the tongue coupling member; oppositely inclined jaw bearing faces formed on the jaw coupling member; articulated connections between the jaw coupling member and the driving shaft; and manually operable means for moving the tongue coupling member toward and from the jaw coupling member.

2. In a variable traverse driving mechanism, the combination of a rotatable driving shaft; a vibratable driven shaft; a rocker arm mounted freely on the driven shaft; oppositely inclined jaw bearing faces formed on the hub of said arm; a crank fixed on the driving shaft; a connecting rod coupling said crank to the rocker arm; a sleeve movable longitudinally on the driven shaft and rotatable therewith; inclined tongues fixed on the end of said sleeve nearer the rocker arm hub; and manually operable means for moving said sleeve toward and from said hub.

3. In a variable traverse driving mechanism, the combination of a driving shaft; a driven shaft; a jaw coupling member mounted freely on the driven shaft; a tongue coupling member rotatable with, and longitudinally movable on, said shaft; tapered tongues fixed on the tongue coupling member; oppositely inclined jaw bearing faces formed on the jaw coupling member; articulated connections between the jaw coupling member and the driving shaft; an operating shaft; a rocker; connections coupling the rocker to the operating shaft; and connections coupling the rocker to the tongue coupling member.

ADAM B. FAHNESTOCK.

Witnesses:
J. SNOWDEN BELL,
FRANK H. CLARK.